United States Patent [19]

Hajek et al.

[11] 4,321,051
[45] Mar. 23, 1982

[54] METHOD OF MAKING A FOLDING FORMER

[75] Inventors: Josef Hajek, Friedberg-Stätzling; Siegfried Rotter, Augsburg; Hans Schwöpfinger, Augsburg; Josef Schwarz, Augsburg, all of Fed. Rep. of Germany

[73] Assignee: M.A.N.-Roland Druckmaschinen Aktiengesellschaft, Offenbach am Main, Fed. Rep. of Germany

[21] Appl. No.: 145,355

[22] Filed: Apr. 30, 1980

[30] Foreign Application Priority Data

May 29, 1979 [DE] Fed. Rep. of Germany ....... 2921757

[51] Int. Cl.³ ............................................. B65H 45/22
[52] U.S. Cl. .................................. 493/439; 493/446; 493/456
[58] Field of Search ............... 493/418, 438, 439, 440, 493/446, 447, 450, 456

[56] References Cited

U.S. PATENT DOCUMENTS 2,997,296  8/1961  Bash ................................... 493/439
3,111,310 11/1963  Dutro ................................. 493/438

Primary Examiner—Edgar S. Burr
Assistant Examiner—A. Heinz
Attorney, Agent, or Firm—Frishauf, Holtz, Goodman & Woodward

[57] ABSTRACT

To provide a smoothly conically converging edge portion of a former, with air communication openings therethrough, the former sheet is bent over at the edge in the conically converging shape with the inner bent-over portion left free; core elements of conical shape matching the cone shape of the bent-over portion are introduced into the open space, and a curable resin such as epoxy, polyurethane or silicone is poured over the core, to adhere to the bent-over portion and the major wall portion of the former and, after dissolving of the core element, leaving air chambers to which air with differential atmospheric pressure can be introduced through connecting stubs which can be cast into the closing-off wall. Solvent, such as tetrachlorethylene to dissolve a polystyrene core can likewise be introduced through these stubs. If a plurality of core units are used, a plurality of separate air communication chambers can be formed with separating walls cast in the gaps or spaces between core elements.

7 Claims, 6 Drawing Figures

METHOD OF MAKING A FOLDING FORMER

The present invention relates to the art of printing and to printing machinery, and more particularly to a method of making a folding former to receive a running web of printed paper and fold the same; and to a folding structure made by the method, and especially to such folding formers in which air openings are formed at the lateral edges to permit application of a differential air pressure.

BACKGROUND AND PRIOR ART

Folding formers are triangular sheet metal elements over which a web is guided. The edges of the sheet metal elements should be smooth and round since the paper web folds thereover. Further, it is desirable that the edges have air supply connections to permit application of air at a differential pressure with respect to ambient air. A typical folding former of the type to which the invention relates is shown in German Published Patent Application DE-AS No. 22 40 397. The lateral edges of the former can be constructed in the form of tubes or pipes of constant diameter, for example by welding the pipes on a sheet metal element. This construction is comparatively inexpensive in manufacture; the former, however, does not have the most desirable shape. For best guidance of paper web of the former triangle, it is desirable that the radius of curvature of the lateral edges decrease continuously towards the apex of the triangle defined by the former. Thus, the air ducts at the lateral edges should have generally conical shape, with their interior diameter decreasing towards the apex of the former. Manufacture of tubes or pipes with conical shape is very expensive.

THE INVENTION

It is an object to provide a manufacturing method for a folding former in which the lateral edges are bent over in such a manner that the radius of curvature of the bent-over edge decreases continuously towards the apex, while still permitting the placement of air ducts; and which is inexpensive and readily adapted to sheet metal handling technology.

Briefly, the folding former is cut from a flat piece of sheet metal with a lateral edge large enough to permit it to be bent over later. Air communication openings are formed in the lateral edge, for example by drilling, punching, or the like. To decrease air flow noise, it is desirable to chamfer the edges of the air flow openings. The lateral edges are then bent over to form a rounded edge portion having generally conical aspect, that is, the folding or bending is carried out with continuously decreasing diameter towards the apex, leaving the inner edge of the folded or bent-over now conical edge portion open. At least one, and preferably a plurality of core elements which have generally conical shape, is then placed within this open cone. The core elements are made of a material which can be dissolved. If a plurality of such core elements are used, then they are preferably positioned staggered from each other so as to leave gaps therebetween. The inner portion of the former then has a casting compound poured thereover, which can penetrate between the spaces of core elements—if used—and flow over the core elements. Suitable casting compounds are epoxy resins, polyurethane resins, or silicone resins. After curing or hardening the casting compound, the core elements are dissolved by a suitable solvent. A suitable material for core elements is a styrene compound, for example "Styropor", which is readily soluble in trichlorethylene or tetrachlorethylene, introduced through openings left in the casting compound which, at the same time, can have been cast around projecting stubs from the cores to provide connecting stubs for air supply hoses, for example.

The result will be a folding former which, in accordance with a feature of the invention, has a continuously decreasing, conical edge portion in which a hollow space, or a plurality of chambers, is formed interiorly of the edge portion, to permit introduction of air at differential pressure with respect to atmospheric. The respective casting compounds adhere to the sheet metal form.

Subdividing the air duct into a plurality of chambers permits application of different pressure differential at different locations of the edge of the former.

DRAWINGS

Figure 1:
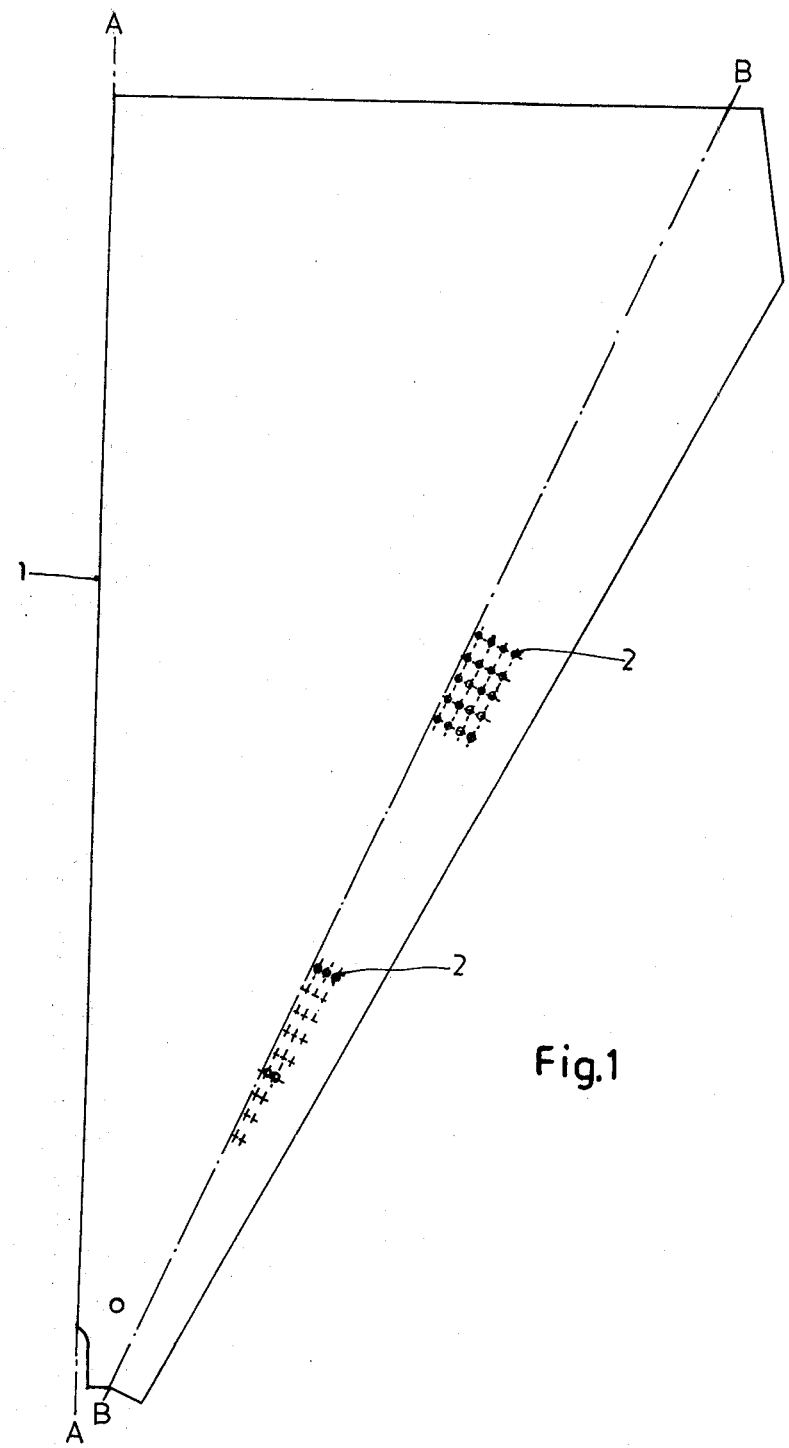
FIG. 1 is a back view of a blank for a former prior to deformation of the edge portion.

As best seen in FIG. 1, the former is made by first preparing an essentially triangular piece of sheet metal having approximately the shape of half the former. Two such sheets are used, joined at their center line A—A. The sheets are symmetrical. After cutting, air exit openings 2 are formed, for example by punching, drilling or the like. If the air exit openings 2 are punched, their shape can be suitably selected in dependence on the shape of the punch, for example square, rectangular, or in the shape of elongated slits, e.g. with rounded, essentially elliptical end portions. The windage noises can be reduced by chamfering the edges of the openings.

In the next step, a bending press is used to bend the flat sheet along the bending or folding line B—B to form a conically shaped end portion 3. The shape of the end portion 3 is clearly seen in FIG. 2 when read together with FIGS. 3 to 6.

Figure 3:
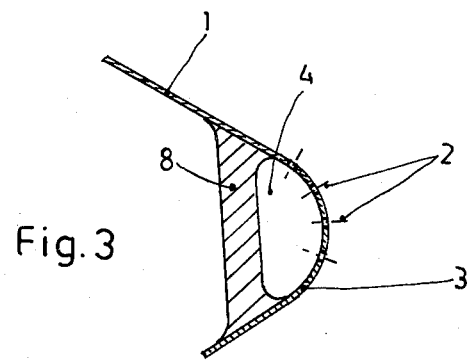
FIGS. 3 to 6 are cross-sectional views along lines III—III to VI—VI of FIG. 2.
Figure 4:
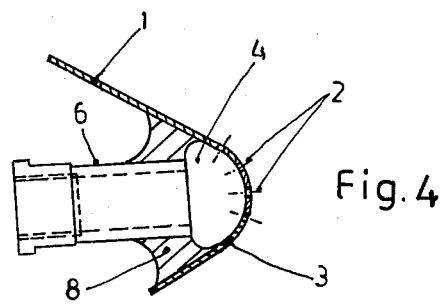
Figure 6:
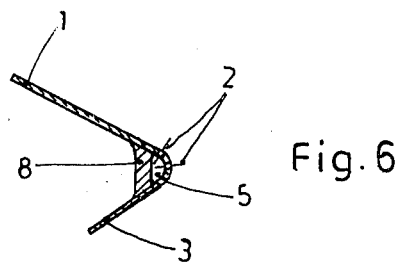

In the next step, cores are placed in the space formed by the bent-over portion 3. These cores have the shape which eventually the air passages or air ducts are to have; in other words, they correspond to the respective air ducts or air chambers 4, 5 (FIGS. 3, 4, 6). For each one of the air chambers or air duct portions, a separate core element is used. The cores are so placed that between them, taken along the longitudinal direction B—B, small gaps or spaces will be left. The cores are made of a material which can be dissolved.

A suitable material for the cores is expanded polystyrene.

Figure 2:
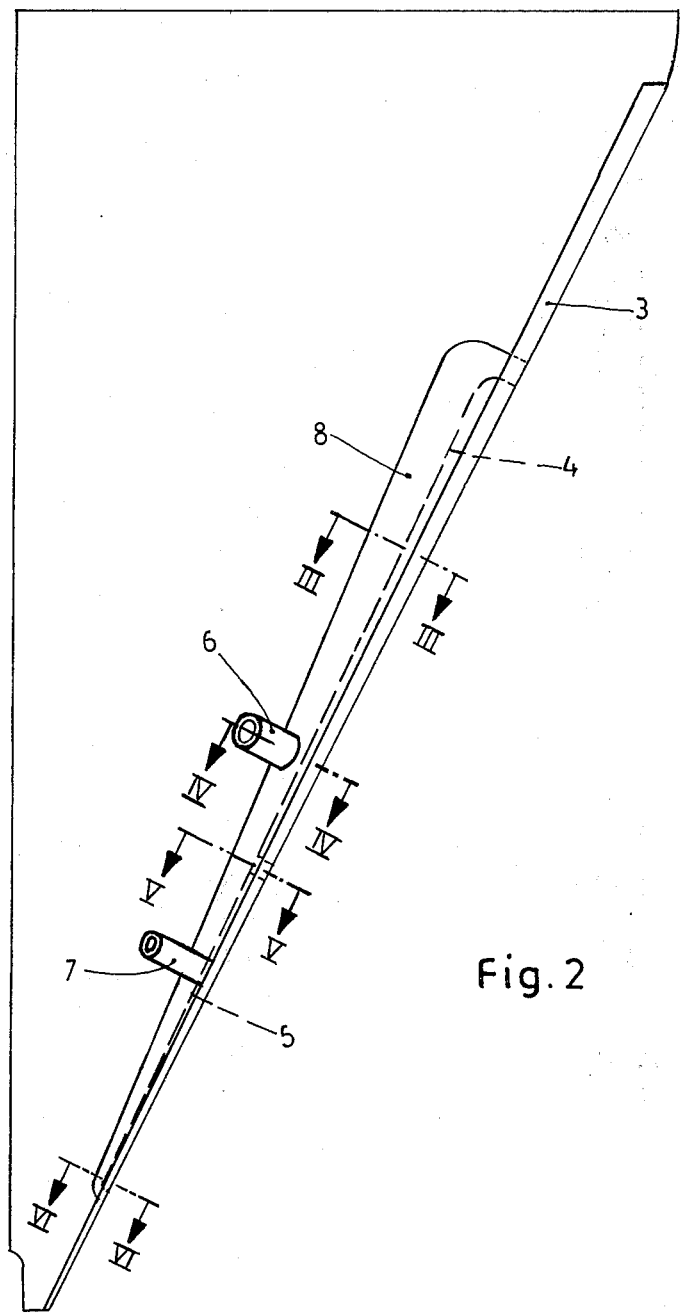
FIG. 2 is a view similar to FIG. 1 of the finished former.

Each core, additionally, carries an air supply connecting stub 6, 7 (FIG. 2).

Figure 5:
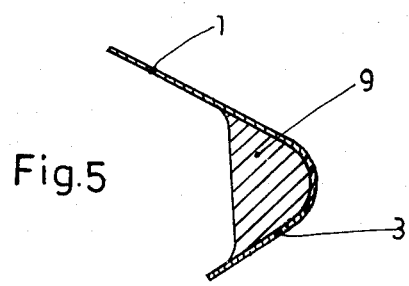

In the next operating step, the cores, with the air supply stubs 6, 7 attached, have a resin cast therebehind, the resin being of a nature that it can harden or cure. The amount of resin is so cast that the distance approximately from the edge of the bent-over portion 3 is covered over to the front wall of the former 1—see FIGS. 3-6, thus forming a back wall 8 out of which the air supply stubs 6, 7 extend. Resin will also penetrate in the space between the cores to form separating walls 9 (FIG. 5).

Suitable casting compounds are epoxy resins, silicone resins, or polyurethane resins.

After hardening or curing of the resin, a solvent suitable to dissolve the cores is introduced through the air supply stubs. For polystyrene, trichlorethylene or tetrachlorethylene are suitable. These materials dissolve the core, but do not attack the cured resins forming wall 8 and the separating walls 9. After dissolving of the cores, the solvent with the dissolved cores is drawn off through the air supply stubs 6, 7.

Air supply chambers 4 are thus formed in the edge portions 3 which can readily be constructed to match and fit the respective air supply requirements. Without additional working steps, the cross section of the chambers can be continuously and monotonically changed. By using a larger number of cores, and suitable shaping of the air communication openings 2, the pressure relationships existing at the surface of the former 2 can be suitably selected by desired placement of the cores, and designing the respective size thereof, so that the chambers will have respective size, and by suitably shaping and designing the air communication openings, air pressure relationships can be optimally matched to the requirements of folding paper around the edge of the former sheet. The respective chambers can be subjected to air of differential pressure. The separating walls 9 between the chambers 4, 5 are automatically formed, and do not require any extra manufacturing steps. By pouring a resin behind the cores, danger of deformation of the former sheet is eliminated. In prior art structures, in which air supply tubes were welded, great care had to be taken to prevent distortion or deformation of the accurately cut former sheet by the welding heat.

Various changes and modifications may be made, and, as is apparent, the size and shape of the former sheet with the air supply chambers can be matched to any desired contour of the former.

For the core foamed polystyrene is suitable, too.

The further materials are suitable to dissolve the core: benzene, toluene, xylene, premium gasoline.

Instead of resin curable india rubber on polysulphide basis or pourable acrylic resin may be used.

We claim:

1. Method to make a folding triangle or former for assocation with a rotary printing machine, having lateral air communication ducts (4) and air communication openings (2) extending through the former at marginal portions thereof, comprising, in accordance with the invention, the steps of providing a flat sheet metal former element of essentially triangular outline;

forming the air communication openings (2) therein at a marginal portion along an edge of the former element;

bending the marginal portion having the communication openings in a continuously conically formed shape, to form open bent-over inned sides of the marginal portions and define an open space between said bent-over marginal portions and a major portion of the flat sheet metal element;

providing at least one core element of a material subject to being dissolved in a solvent, and having a conical shape matching at least a portion of the conically decreasing edge portion of the former, and positioning said core element in the open space defined by the bent-over marginal portion and fitting against said marginal portion;

pouring a curable or hardenable resin over the core element engaging the walls of the former to form a bridge between the bent-over marginal portion and the flat portion of the former;

permitting said resin to harden or cure;

and dissolving the core element with a solvent.

2. Method according to claim 1, wherein the step of providing said core element comprises providing a core element with a communicating duct stub; and including the step of introducing said core element with the duct stub extending in the open space behind the major portion of the former;

the step of pouring the resin comprises pouring said resin over the core element and surrounding the duct stub;

and the step of dissolving the core element comprises introducing the solvent through the duct stub, and then removing the dissolved core element therethrough.

3. Method according to claim 1, wherein the step of providing at least one core element comprises providing a plurality of core elements of respectively different sizes fitting, staggered, within said open space behind the bent-over marginal portion, and the step of positioning said plurality of core elements comprises positioning said core elements with gaps therebetween;

and the step of pouring the resin comprises additionally pouring resin in the gaps between said core elements to form dividing walls (9) between said core elements and, after curing, to form a plurality of separate air communication ducts or chambers in said marginal portion.

4. Method according to claim 3, wherein the step of providing said core elements comprises providing core elements each with a communicating duct stub, and including the step of introducing said core element with the duct stubs extending in the open space behind the major portion of the former;

the step of pouring the resin comprises pouring said resin over the core elements and surrounding the duct stubs;

and the step of dissolving the core element comprises introducing the solvent through the duct stubs and then removing the dissolved core elements therethrough.

5. Method according to claim 1, wherein said resin comprises at least one of the materials of the group consisting of epoxy resin, polyurethane resin, silicone resin.

6. Method according to claim 1, wherein said core material comprises expanded polystyrene.

7. Method according to claim 6, wherein said solvent comprises trichlorethylene or tetrachlorethylene.

* * * * *

UNITED STATES PATENT AND TRADEMARK OFFICE
CERTIFICATE OF CORRECTION

PATENT NO. : 4,321,051
DATED : March 23, 1982
INVENTOR(S) : Josef Hajek

It is certified that error appears in the above-identified patent and that said Letters Patent is hereby corrected as shown below:

Column 1, line 67, after "silicone resins." insert --
The casting compound thus is molded on the adjacent metal.--.
Column 3, line 2, after "resins" insert -- as the compounds
cure they will mold on the adjacent portions of the sheet
metal -see Figs. 3-6.--.
Claim 1, column 3, line 57, change "formed" to --
decreasing--.
                line 58, change "inned" to --inner--.
                line 59, after "marginal" insert --edge--.
                           change "portions" to --portion--.
                line 60, after "marginal" insert --edge--.
                           change "portions" to --portion--.

Signed and Sealed this

Thirteenth Day of July 1982

[SEAL]

Attest:

Attesting Officer

GERALD J. MOSSINGHOFF
*Commissioner of Patents and Trademarks*